Jan. 21, 1936.    H. SWAN ET AL    2,028,711
PRINTING PLATE
Filed May 26, 1934
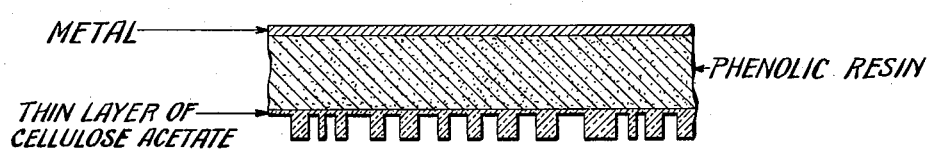
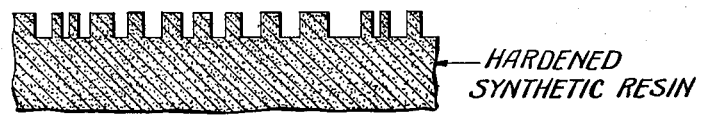
INVENTORS
Hylton Swan
Sigfried Higgins
BY Jos. L. Nielsen
ATTORNEY Patented Jan. 21, 1936

2,028,711

UNITED STATES PATENT OFFICE 2,028,711

PRINTING PLATE

Hylton Swan, Upper Montclair, and Sigfried Higgins, Verona, N. J., assignors to Bakelite Corporation, New York, N. Y., a corporation of Delaware Application May 26, 1934, Serial No. 727,724

14 Claims. (Cl. 41—25)

This invention relates to a printing plate and a method of preparing same.

Printing plates made wholly of phenolic resins have been proposed but are not satisfactory. The resin is brittle and breaks easily unless it contains fibrous filler and a printing face wherein fibrous filler is exposed together with resin is undesirable, as the surface of the small dots of halftone plates should be uniform. Rubber facings have been proposed but the oils in the common inks attack the rubber. Metal facings have been proposed but if the metal is hard enough to wear well and not scratch it is too hard to mold except at very high pressures, and if soft enough to mold well, it does not wear satisfactorily and is easily injured. Plates made entirely of cellulose acetate or nitrate prove unstable in dimensions.

Among the objects and features of the present invention is a plate which can be made easily and quickly from materials readily obtainable in the open market and which overcomes many of the faults of the prior art resin-body-printing plates.

We have discovered that for thermoplastic materials like cellulose acetate there is a very definite tough skin-like effect at the surface portion as distinct from a softer and more plastic flow at the center portion when the piece is subjected to impact. This effect is very important for printing plates and the discovery points the way to commercially satisfactory printing plates with surfaces of cellulose acetate. Furthermore, in sheets for instance, this strengthening effect of the surface portion as referred to the whole mass in cross sectional units is very definite if the sheet is very thin. If this surface effect does extend to thicker pieces it seems to be largely obscured for printing plate use by an inherent weakness of the center portion as is indicated by a change in dimension under use, of a plate made entirely of cellulose acetate.

The printing plate which we have invented includes a phenolic resin body and a printing surface of cellulose acetate. The cellulose acetate printing surface is extremely tough and wear resistant, not attacked by oils in the common inks and has great resistance to wear and deterioration both in use and in storage before and after use. The cellulose acetate molds more easily than metal for instance in a mold at approximately 150 C. a molding pressure of approximately 700 pounds per square inch may be used whereas with metal faces pressures in the neighborhood of 7000 pounds per square inch and upwards are usually found necessary in commercial practice. The printing surface readily takes ink from the inking rollers and gives it up to the paper, and provides a tough surface which is not easily scratched. The surfacing material has a slight but sufficient spring or resilient property so that it is not damaged by grit or other small hard bodies which may be in the ink or paper thus preventing the hard bodies from scratching or injuring the surface as they would permanently scratch a metal surface or possibly chip the surface of a phenol resin. Being tougher and not so brittle as a phenolic resin, they do not require a fibrous filler to produce the required strength and thus the printing surface is very uniform. As previously stated, the phenolic resin itself is brittle, and the very finest fibrous fillers which are practical to give the required strength may be as large as the small dots on a half tone plate or a great part of a larger size dot. When a plate of resin-filler composition wears to expose the filler, the surface of a dot or series of dots may thus be wholly or partly of filler which has different ink receiving and delivery characteristics than the resin and therefore the printing surface is not uniform. Furthermore, the fillers absorb moisture when exposed and swell, thus causing burs. The cellulose acetate faithfully reproduces the smallest hair lines and dots on the matrix but as the material is tough there is very little danger of the exceedingly small printing areas chipping off as would printing faces of a corresponding size composed entirely of resin. Furthermore, due to the plasticity of the cellulose acetate when heated, large printing areas may be accurately reproduced without the use of extremely high forming pressures which may damage the surface of the matrix. Moreover, the printing surface readily releases from the surface of a hardened synthetic resin matrix; such matrices are highly desirable for use in forming the plate due to their strength, light weight, durability and ability of reproducing the original type or other printing areas.

Other objects and features of the invention will be pointed in the claims and will be understood from the following part of the specification wherein one of the preferred forms of the invention is disclosed, together with the drawing illustrating a plate and matrix.

The cellulose acetate is readily procurable in the open market in thin sheets usually containing modifying agent, plasticizers, waterproofing agent, waxes, etc. The material is thermoplastic and readily moldable under heat and pressure yet when at approximately room temperature, it is slightly resilient, tough, and resistant to scratches. If desired, the cellulose acetate may be dissolved in a solvent, for instance acetone, and resheeted after embodying such modifying agents, plasticizers, water-proofing agents, waxes, etc. as may be desired to produce variations in the characteristics. The toughness and strength of the cellulose acetate is sufficient so that fine lines and small dots do not mushroom or spread when printing pressure is applied but the surface has a slight springy yield as compared to metal surfaces where a deformation leaves a permanent scar or as compared to phenolic resin surfaces which are brittle and hard with no yield. The sheet of cellulose acetate which we use may, for example, be from .001 to .035 of an inch in thickness, preferably without fibrous filler or other material which might adversely affect the printing characteristics of the plate. If the film is much thicker than .035 of an inch the strengthening skin effect appears to be lost very rapidly as the thickness increases. The cellulose acetate surfacing should be thicker than a normal varnish film as the material is thermoplastic, and molds into the depressions in the matrix; if insufficient material is used to form a continuous layer to join the bases of the small dots or printing characters, such dots or printing characters are likely to tear off of the base. Although we do not intend to exclude a facing built up to the required thickness by the repeated application of varnish layers of cellulose acetate, or a facing molded of commercial cellulose acetate molding powder, a sheet of the acetate is greatly preferred for convenience in preparing the blanks and speed in molding the plates, and also because the amount of cellulose acetate and the thickness of the layer can be accurately determined, and it is relatively even, which latter characteristic might be difficult to obtain merely by spreading the cellulose actetate powder over the matrix. The cellulose acetate sheets may be roughened on one side, for instance by sand blasting, to assist in bonding the sheet to the body composition.

An illustrative method of making the plates will now be described, it being understood that the description is by way of example only and that variations thereof may be made as desired.

The sheet of cellulose acetate is coated with an adhesive which adheres to both the resin body and the cellulose acetate facing, for example, an acid degenerated rubber in a solvent solution. A general example of a suitable adhesive is a solution, emulsion or dispersion comprising rubber, benzol and acetone. The acid degenerated rubber will adhere to both the resin and the cellulose acetate. The cellulose acetate sheet may also be coated with the degenerated rubber adhesive and placed in the mold with sufficient phenolic resin powder above it to give the required thickness of the plate. In still another form, a sheet of fibrous material, for instance paper, blotting paper or cloth, may be impregnated with the degenerated rubber adhesive or may be coated on one side with a varnish containing phenolic resin and on the side with a varnish containing a cellulose acetate, and then used as an intermediate bond between the cellulose acetate facing and the phenolic resin body.

The body of the plate may and preferably includes sheets of paper or other fibrous material impregnated with a phenol resin as is usual in the production of laminated phenolic resin boards or panels. Although it is not intended to exclude bodies made of phenolic resin molding powder which may be compressed and molded against the cellulose acetate facing during the formation of the plate, we much prefer the resin-fiber material in the form of boards or sheets of the required thickness so that blanks of assembled resin backing and cellulose acetate facing may be produced and stored until ready for molding into the finished plates. The resin fiber material of any desired thickness and containing heat softening and moldable synthetic resin, may be procured in the open market at a relatively low cost.

After coating the surface or surfaces to be joined with the above adhesive or other suitable material, and preferably after waiting until the adhesive becomes tacky, the sheets are assembled and compressed together to form a unitary composite sheet or plate blank. A metal foundation plate may be desired, in which case the adjoining surfaces of the metal and resin-filler composition may be coated or impregnated with a suitable metal-resin adhesive, for instance the adhesive previously given, and then brought together under pressure. Where the metallic sheet is used, it may be cemented to the resin before, or after or during the time that the resin body material is cemented to the cellulose acetate facing. A stack of the assembled sheets may be held under pressure until the cement is thoroughly set. If desired, however, the composite sheet may be molded directly after assembly but if a wet adhesive is used, the press should be vented to allow for the escape of the volatile ingredients of the adhesive.

Having made the plate blank, it may be formed into a printing plate in the following manner. The matrix used is preferably of a heat-hardened synthetic resin, for instance a phenolic aldehyde condensation product, which is unaffected by temperatures suitable for hardening the resin body of the plate and molding the cellulose acetate facing. As the cellulose acetate readily releases from the previously hardened phenolic resin, from which the matrix may be made, the blank may be laid in a heated press with the cellulose acetate face directly against the matrix and then the composite blank subjected to heat and pressure until the printing surfaces have been formed on the face and preferably until the synthetic resin has thoroughly consolidated. It is possible to remove the plate from the press before the resin has reached the desired heat hardened stage and then continue the heating in an oven but this is not recommended as the plate may be damaged by such removal and the oven heating must be very carefully regulated so as not to melt the characters on the cellulose acetate surface. The molding of the printing face may take place in a flat mold where laminated materials are used, and in a semipositive or positive mold where powdered material is used either for the facing or the body so that a check is offered to the side flow of the plastic material. This check of the side flow of the plastic material gives a plate with a substantially uniform density and definition at the corners and edges, and the mold should be cool before removal of the plate so as to harden the cellulose acetate, which is permanently thermoplastic and not heat hardened as the phenolic resins.

As the mold heats, the cellulose acetate and resin soften and are pressed toward the matrix, forcing the cellulose acetate surfacing to flow and conform to and thus fill, and reproduce the reverse of the matrix surface. The resin body material when plastic acts as a hydrostatic cushion while the cellulose acetate is taking the exact definition of the matrix face. Then the resin hardens so that a uniform plate is obtained. The mold is thereafter cooled sufficiently to harden the cellulose acetate and prevent injury to the printing characters when the plate is removed from the mold and matrix.

The cellulose acetate need contain no fibrous filler and thus the printing surface is very uniform and homogeneous with the ink receiving surfaces composed solely of cellulose acetate with no exposed particles of fibrous filler to give uneven printing characteristics to the ink receiving and delivering surfaces. The cellulose acetate is thick enough so that the characters as well as the base layer or floor of the printing surface are all of the same material and thus the small dots and printing characters adhere very well to the plate. The finished plate has the tough surface of the cellulose acetate and the hard backing of the phenol resin but the small dots and fine lines of the printing surface will not crack or chip as would a phenol resin surface.

The preferred form of the invention has been described but it is not intended to exclude modifications thereof. The phenol resin body may, in certain situations be replaced by other synthetic resins, for instance the urea and thiourea resins. It is therefore recognized that there are many variations of the invention and it is desired that the invention be construed as broadly as the claims taken in conjunction with the prior art may allow.

We claim:

1. A printing plate having a facing comprising cellulose acetate from substantially .001 to substantially .035 of an inch in thickness and body of resin.

2. A printing plate having a facing comprising cellulose acetate and body of synthetic resin, the facing being sufficiently thin to provide only a tough skin.

3. A printing plate having a facing comprising cellulose acetate and body of heat-hardened resin, the facing being sufficiently thin so that all portions have substantially the same characteristics.

4. A printing plate having a molded facing comprising cellulose acetate and body of resin, the facing being thick enough only to provide a substantial floor for the printing characters.

5. A printing plate having a facing comprising cellulose acetate and body of phenolic resin, the facing being from substantially .001 to substantially .035 of an inch in thickness.

6. A printing plate having a resinous body and a facing comprising cellulose acetate presenting molded printing characters of the same facing material, said facing being thick enough only to provide a substantial floor for the printing characters.

7. A printing plate having a resinous body and a facing comprising cellulose acetate presenting molded printing characters of the same facing material, the printing characters presenting ink receiving surfaces without filler and the facing being sufficiently thin to provide only a tough skin.

8. A printing plate having a resinous body and a facing comprising cellulose acetate presenting molded printing characters of the same facing material, the printing characters presenting ink receiving surfaces without exposed filler and the facing being sufficiently thin so that all portions have substantially the same characteristics.

9. A printing plate having a resinous body and a continuous facing layer from substantially .001 to substantially .035 of an inch in thickness comprising cellulose acetate presenting integral molded printing characters of the same facing material.

10. Method of producing a printing plate comprising laying a composite assembly having a facing of cellulose acetate and a body including a synthetic resin in molding position with the cellulose acetate toward a matrix, and subjecting the assembled parts to pressure to mold a printing surface on the cellulose acetate from the matrix, the facing being thick enough to provide only a substantial floor for the printing characters.

11. Method of producing a printing plate comprising forming a composite sheet having a facing of cellulose acetate from substantially .001 to substantially .035 of an inch in thickness and a body including a synthetic resin, laying the composite sheet in molding position with the cellulose acetate toward a matrix, and subjecting the assembled parts to pressure to mold a printing surface on the cellulose acetate from the matrix.

12. Method of producing a printing plate comprising forming a composite sheet having a facing of cellulose acetate sufficiently thin so that all portions have substantially the same characteristics and a body including a hardenable synthetic resin; laying the composite sheet in molding position with the cellulose acetate toward a matrix, subjecting the assembled parts to pressure to mold a printing surface on the cellulose acetate from the matrix and hardening the resin.

13. Method of manufacturing plates having topically raised and depressed areas of cellulose acetate and bodies comprising hardened synthetic resin which comprises uniting the cellulose acetate and body and molding the assembly with the cellulose acetate face against a matrix having a face of hardened synthetic resin.

14. Method of manufacturing plates having topically raised and depressed areas of cellulose acetate which comprises providing a blank having a facing of moldable cellulose acetate and providing a matrix having a face of hardened synthetic resin, molding the cellulose acetate against the matrix under heat and pressure, and hardening the cellulose acetate.

HYLTON SWAN.
SIGFRIED HIGGINS.